UNITED STATES PATENT OFFICE.

JOHN BLAIR, OF SPRINGDALE, WASHINGTON, ASSIGNOR OF ONE-THIRD TO CHARLES M. FASSETT, OF SPOKANE, WASHINGTON.

PROCESS OF MAKING TANNIN EXTRACTS.

SPECIFICATION forming part of Letters Patent No. 616,882, dated January 3, 1899.

Application filed December 28, 1897. Serial No. 664,091. (No specimens.)

*To all whom it may concern:*

Be it known that I, JOHN BLAIR, a subject of the Queen of Great Britain, residing at Springdale, in the county of Stevens and State of Washington, have invented a new and useful Process of Obtaining Tannin Extract from the Leaves of Coniferous Trees, of which the following is a specification.

The object of the present invention is to effect the economical and rapid manufacture of tannic acid or extract from the waste leaves and "brush" of trees of that class termed "*Coniferæ*," such as pine, fir, balsam, cedar, and other evergreens.

My invention is an improvement in the art of obtaining tannin extract or tannic acid from the waste of coniferous trees, which consists in steaming such waste in a macerated or pulverized condition in a weak solution of water, an alkaline carbonate, and permanganate of potash, such solution being of a strength sufficient to act upon resinous matters present in such waste and allow the tannic acid to dissolve readily from the waste, and subsequently evaporating the solution to a solid or semifluid condition. In this art of obtaining tannic acid from the leaves or fiber of coniferous trees by steaming the waste in the described chemical solution great care and experience are required to avoid the use of a strong solution, because an excess of the alkaline carbonate and potassium permanganate has a tendency to destroy the tan compounds obtained from the coniferous waste, and also to change the tannin into undesirable red coloring-matter, which has an injurious effect on leather. The small proportion of permanganate of potash which I employ in combination with the alkaline carbonate in the solution is advantageous, because it takes up the tannic acid, together with the coloring-matter, which is present in all tan-producing trees. The alkali in the solution facilitates the dissolution of resin which is associated with the tannin in the body of the leaves or waste treated by my process.

In practicing my invention I proceed as follows: The leaves and boughs are first crushed by passing them through fluted or corrugated rollers, and afterward they are subjected to the action of a suitable cutting-machine; but as the mechanical appliances used are of the ordinary or any preferred character no novelty therefor is claimed herein. The substance thus crushed and cut is in a finely-divided or pulpy condition, which permits the chemical solution employed in my process to thoroughly permeate the mass of macerated vegetable matter and thus promote the extraction of the resinous matters therefrom, to act more rapidly upon the fibrous matter, and prevent the loss of the tannic acid due to prolonged boiling or steaming of the macerated or pulpy vegetable mass.

It has been found that the tannic acid in fibrous vegetable matter is decomposed and evaporated by long-continued boiling of the mass and overheating thereof above the boiling-point, and to overcome this objection I treat the mass chemically to rapidly and thoroughly extract the resinous matters therefrom. The following is a typical formula for treatment of the macerated mass of fibrous vegetable matter, which, as shown by experience, produces a good grade of tannin extract: To a charge of two thousand (2,000) pounds of the pulp obtained from cedar fir or leaves I add one and one-half ($1\frac{1}{2}$) pounds of permanganate of potash or its equivalent of bichromate of potash and ten (10) pounds of borax (or an alkaline carbonate). The mass being charged with the chemicals into a suitable vat or vessel heated by steam or otherwise, hot water is added to the pulp in sufficient quantity to thoroughly saturate the same and dissolve the chemicals, thus producing the alkaline solution. The mass is steamed for a period of one (1) hour or for a sufficient time to allow the mother-liquor or alkaline solution to become saturated thoroughly with the resinous matters extracted from the fibrous mass or pulp. The extraction of the resinous matters containing the gummy substances and the chlorophyl compounds from the fibrous pulpy mass and the absorption by the alkaline solution of such resinous extract from the fibrous pulpy mass can be ascertained by the change which takes place in the color of the charge, because the macerated leaves lose their green color and the alkaline solution, which at first has a green tinge, passes to that of a brown color. At this stage of the treatment the solution is transferred to another vessel for further treatment, and the mass of pulp remaining in the vat or vessel is again treated by subjecting it to the action of an alkaline solution and steamed. The alkaline solution, saturated with the resinous matters, is now subjected to the action of a weak acidulated solution, preferably of sulfuric acid. The acidulated solution neutralizes the alkali contained in the solution with the resinous matters and effects the separation of the tannin from the gummy substances and chlorophyl compounds contained in the resinous matters without risk of decomposing by heat the tannin extract. During the neutralization of the alkaline solution bearing the resinous matters care must be exercised, as this step must be determined by experience. The liquid is now filtered and then evaporated to reduce it to the consistency of a syrup or solid tannin extract useful in the arts for tanning leather and for other purposes.

The compounds entering into the solution of the liquor when the leaves of coniferous trees are treated by a weak solution of alkali and potassium permanganate consist largely of tannic acid, red and yellow coloring-matter, albuminoids, resinous compounds, and mineral salts. While I do not deem it necessary to set forth the quantity of these various substances present in the extract, an analysis made on two occasions to test the percentage of tanning compounds shows that an extract obtained from fir leaves contained forty-six per cent. and fifty-six per cent., respectively, of tannic acid, together with coloring-matter and other products before enumerated. A solution containing tannin obtained from the leaves of coniferous trees discloses the presence of a large quantity of rosin, which gives a clear amber color to such solution. The admission of a weak acidulated solution to the amber-colored alkaline solution effects the clarification of the solution by the precipitation of the resinous matters with a very small quantity of tannic acid, which clings to it in a mechanical way. The object of admitting the acidulated solution to the alkaline is to precipitate suspended matter, together with the resinous compounds which are dissolved by the alkali in the solution, thus obtaining tannin extract from resinous matters and finely-divided fiber, and to render the extract suitable for light-colored tanning of leather.

By aid of a solution consisting of a mixture of potassium permanganate and an alkali in substantially the proportions enumerated a solution of tannic acid is obtained from leaves of coniferous trees rich in materials known as tannin compounds, and analysis of the tannin extract discloses that the product obtained is of a superior quality and contains a large percentage of tannin.

It will be understood that the percentage of tannic acid in the solid extract varies according to the kind of tree from which the leaves are obtained, the season of the year the brush or leaves are cut; the locality in which the trees are grown, and the manner of conducting the process. The percentage of tannin obtained, roughly speaking, in the extract varies from thirty-five per cent. to sixty-five per cent., the remainder of the solution or extract being composed of coloring compounds, soluble salts, albuminoids, and resins.

I do not confine myself strictly to the formula herein given, as I find that conditions often arise in which judgment must be exercised in treating the leaves and brush obtained from different kinds of trees. For example, in treating the mass of fibrous matter obtained from trees of the character known in this locality as "black pine" or "bull pine" a larger quantity of chemicals are required to thoroughly decompose the gummy substances, albuminoids, and chlorophyl compounds in order to free the tannic acid and obtain a suitable tannin extract. The season of the year at which the brush is cut also influences the treatment, because resinous compounds predominate during the spring of the year in the trees of the kind above enumerated, while in other kinds of trees the albuminoids are more abundant at the same time of the year. Hence judgment must be exercised in treating the fibrous mass.

After the extracting of the resinous matters from the fibrous mass of vegetable matter the residue may be treated to thoroughly cleanse the same and produce a soft flexible fiber suitable for use in the arts—as, for example, to be incorporated in pulp for manufacturing into paper or for upholstering purposes for furniture. I first mechanically screen the residue or by-product to remove all the bark and other objectionable matter, and the fibrous residue is well washed in several changes of water. If desired, the fibrous residue may now be bleached by the aid of chlorid of lime or sulfurous acid, again washed, and thoroughly dried. The bleached fibrous product is suitable for incorporation into paper-pulp; but if the fiber is to be used for upholstery purposes or for manufacture of cheap paper the fibrous product may only be washed and dried, the bleaching step being omitted.

Having thus described the invention, what is claimed is—

1. The process of obtaining tannin extract which consists in steaming leaves of coniferous trees in a weak solution of potassium permanganate and an alkali to extract the tannin from the leaves, then precipitating the resinous matters from the tannin extract, and subsequently evaporating the solution to a solid or semifluid condition, substantially as described.

2. The process of obtaining tannic acid which consists in steaming leaves of coniferous trees in a weak solution of potassium permanganate and an alkali to extract tannin and resinous matters from such leaves; then admitting to the solution of potassium permanganate and alkali a weak acidulated solution which clarifies the first-named solution and precipitates the resinous matters therein, and finally evaporating the resultant solution to a solid or semifluid condition, substantially as described.

In testimony that I claim the foregoing as my own I have hereto affixed my signature in the presence of two witnesses.

JOHN BLAIR.

Witnesses:
FOREST I. PHELPS,
FRANK WILSON.